Jan. 30, 1934.  H. E. SLOAN ET AL  1,945,496

PRESS ACTUATING MECHANISM

Filed Nov. 23, 1932  2 Sheets-Sheet 1

INVENTORS
Harry E. Sloan
George A. Högberg
by Arthur F. Jenkins
ATTORNEY

Jan. 30, 1934.                H. E. SLOAN ET AL                1,945,496
                         PRESS ACTUATING MECHANISM
                         Filed Nov. 23, 1932         2 Sheets-Sheet 2
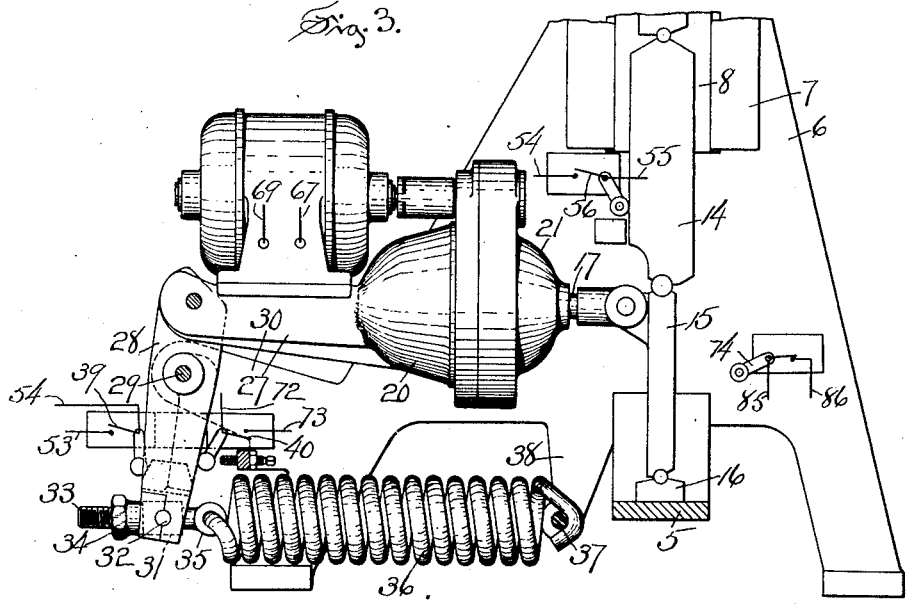
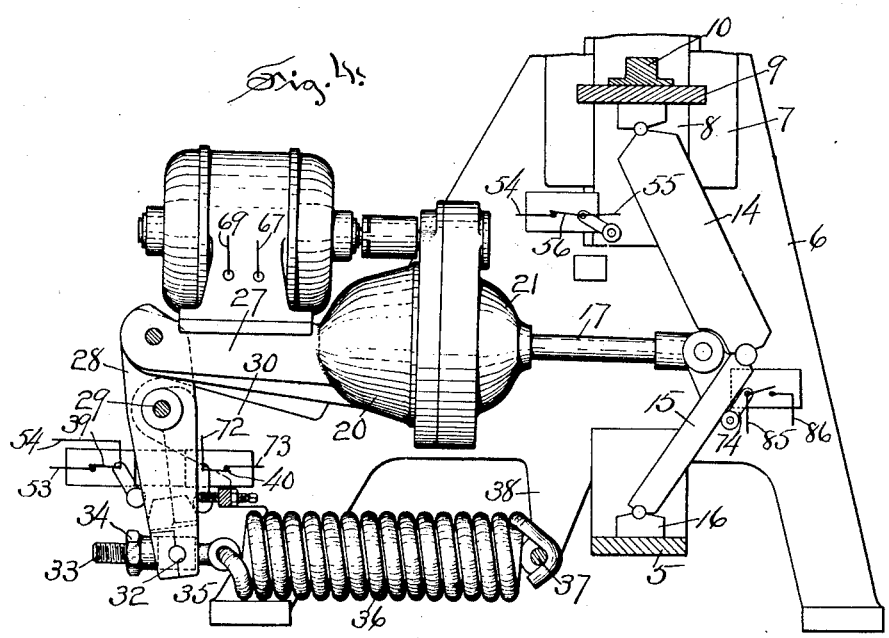
INVENTORS
Harry E. Sloan
George A. Higliberg
by
Arthur B. Jenkins
ATTORNEY Patented Jan. 30, 1934

1,945,496

UNITED STATES PATENT OFFICE 1,945,496

PRESS ACTUATING MECHANISM

Harry E. Sloan, Hartford, and George A. Highberg, West Hartford, Conn., assignors to The Cushman Chuck Company, Hartford, Conn., a corporation of Connecticut Application November 23, 1932
Serial No. 644,046

15 Claims. (Cl. 192—150)

This invention relates to mechanism more especially employed in the operation of presses where high pressures are required, such pressures being applied and released by movement of members in opposite directions, and an object of the invention, among others, is the production of a machine of this type that shall be simple in construction and particularly efficient in operation.

One form of a machine embodying the invention and in the construction and use of which the objects herein set out, as well as others, may be attained is illustrated in the accompanying drawings, in which—

Figure 4 is a similar view, but showing the parts in released position.

Figure 5 (Sheet 1) is a diagrammatic view of a system of wiring for operating the machine.

While this invention is not limited in its application to a machine of any particular type, yet, as it readily adapts itself for use in connection with presses for molding articles from plastic material such a machine has been selected for the purpose of disclosure of the invention herein, it being however the intent and purpose that the invention may be equally well applied to mechanisms which may be employed for other purposes.

Figure 1:
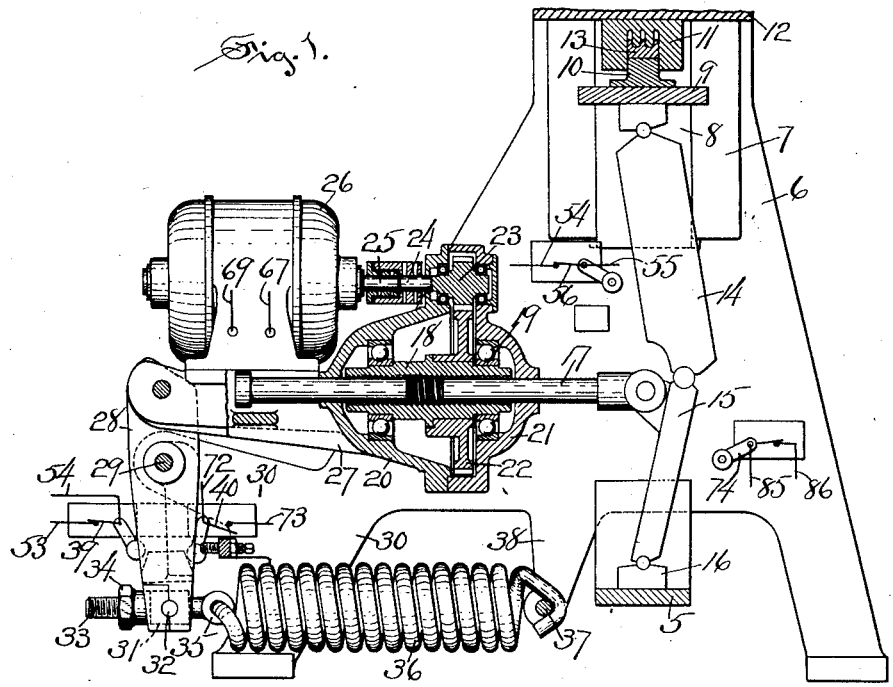
Figure 1 is a view in central vertical section through a machine embodying this invention and showing the parts in mid-position so far as operation is concerned.

In the accompanying drawings the numeral 6 denotes the sides of the frame of this improved machine, which parts may be tied together by cross bars and braces in any suitable manner, such strengthening members not being especially shown herein. Guides 7 for slides 8 are secured to the inner faces of the sides in any suitable manner, and the slides support a table 9 secured at its ends to the slides, said table being adapted to support the male member 10 of a die, the female member 11 of said die being secured to the under side of a head 12, the lower portion only of which is shown in Fig. 1 of the drawings, said head being secured to the sides in any suitable manner. The dies are shown herein as containing plastic material 13 which is shown in Fig. 1 as being partially compressed.

In the formation of some articles from certain kinds of material it is impracticable to apply the full pressure continuously until the article is completely formed, and it is the purpose of the present invention to provide a machine having means for applying a step-by-step pressure until the full pressure is reached, and this is accomplished by mechanism as follows.

Figure 2:
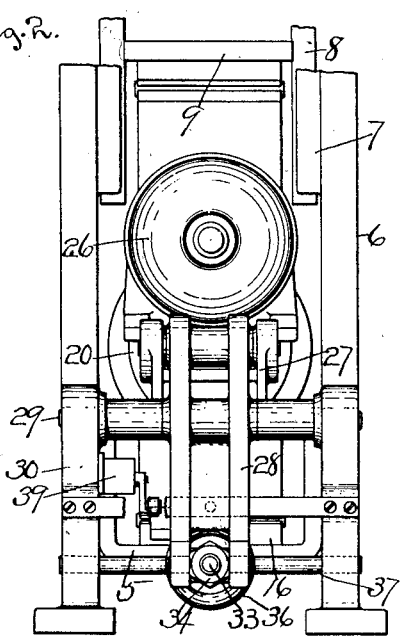
Figure 2 is an end view of the same.

A toggle joint comprising members 14 and 15 is utilized for operating a die member, the toggle member 14 being pivotally connected with the table 9 and the toggle member 15 being pivotally attached at its upper end to the lower end of the member 14 and thrusting at its lower end against a block 16 supported on a rest 5 secured to and extending between the sides 6, and as shown in Figs. 1 and 2 of the drawings.

A toggle actuating rod 17 is pivotally attached to one of the toggle members, to the lower member as shown herein, near the joint, this rod having a screw thread fitting a screw thread in a toggle actuating sleeve 18 rotatably mounted, as upon ball bearings 19, in a housing 20 and a cap 21 therefor, the rod 17 preferably extending through said housing. A gear 22 is secured to the sleeve 18 as a means for rotating it, said gear meshing with a pinion 23 formed integral with or secured to a shaft 24, said shaft and pinion being rotatably mounted in the housing 20 and its cap 19. The shaft 24 is connected with the shaft 25 of a motor 26 in any suitable manner, it usually being desired to provide a joint between these shafts that will be more or less flexible to secure alignment between them.

Supporting bars 27 extend from the closed end of the housing 20 said bars being pivotally connected at their ends with the upper end of a housing shifting lever 28 pivotally supported upon a shaft 29 mounted at its opposite ends in rearward extensions 30 of the sides 6 of the frame, and as shown in Figs. 1 and 2 of the drawings.

The shifting lever 28 is preferably composed of two side members, spaced apart at their lower ends, to receive a block 31 having studs 32 projecting from opposite sides into holes in the lever to pivotally mount the block therein. A bolt 33 projects through said block and is adjustably secured as by means of a nut 34. An eye 35 on said bolt receives one end of an actuating spring 36, the opposite end of said spring being attached to a rod 37 extending between projections 38 from the lower edges of the side parts 6 of the frame, and as shown in Fig. 1 of the drawings.

In the operation of this mechanism, the motor being started as by means of a switch to be hereinafter described, and the parts being in the position shown in Fig. 4 with plastic material between the die members 10 and 11 power is applied by the motor through the pinion 23 and gear 22 to the sleeve 18, rotating the latter, and by means of the interengaging screw threads on said sleeve and rod 17 the toggle joint is drawn to the left, forcing the die members together to compress the material 13 therein. When a certain pressure is exerted, said pressure being determined by the tension of the spring 36, movement of the toggle levers will be stopped, and the tension of the spring being overcome the action of the interengaging threads between the rod 17 and sleeve 18 will cause the housing 20 and all the parts supported thereby and therewith to be moved to the right, thereby tensioning the spring 36.

The movement of the housing 20 and parts supported therewith will continue until the lever 28 encounters an intermediate, normally closed stopping switch 39 supported on the frame of the machine and to be hereinafter more specifically referred to, said switch being actuated to momentarily stop the operation of the motor.

Figure 3:
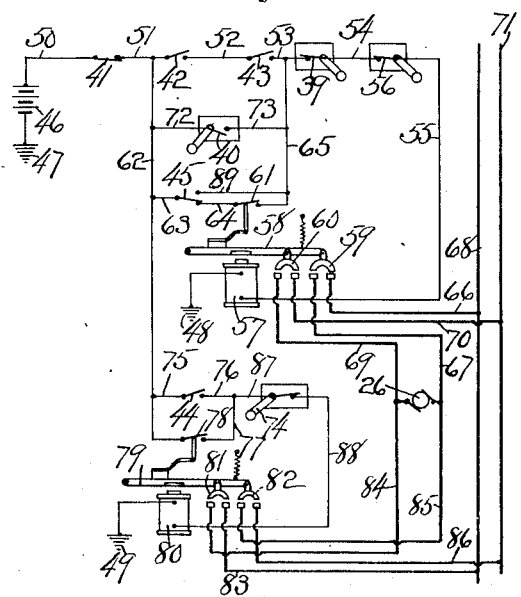
Figure 3 is a view in vertical section through the frame, the operative parts being shown in side view and in compressing position.

The pressure of the spring 36 is now exerted upon the mold parts, thereby slowly forcing the plastic material into all the crevices of the mold and thereby reducing the pressure between the die parts with the effect that the spring gradually returns the lever 28 to the position from which it started. As the lever reaches the end of its path of movement in this direction it encounters an intermediate, normally open starting switch 40, to be hereinafter more specifically referred to, thereby starting the motor and repeating the operation of the machine, and this repeated operation may be continued as many times as may be desired, depending upon the plasticity of the material 13, the intricacies of the mold, etc. In the structure herein shown the operation is twice repeated, the toggle lever and connecting parts moving from the position shown in Fig. 4 to the position shown in Fig. 1 for the first operation and to the position shown in Fig. 3 for the second and final operation.

The operations of the machine herein set forth may be controlled in various ways, but it is preferred that this control shall be by means of a control box of any well known and suitable construction, such as are commonly employed in the operations of machines of various types, and for which reason a showing of said box is omitted herein. In the arrangement of the electrical apparatus now about to be described and which is illustrated in Fig. 5, five buttons are employed for controlling the operations, the showing of such buttons also being omitted, but the switches which will be operated by the buttons being illustrated, said switches each being of that type that when a button is actuated to operate it its reverse action will be automatic, in a manner well known.

These buttons will be arranged in proximity each to the others, one button operating a supply switch 41 for the purpose of supplying electric current to the wiring system. A second and third button actuate two main starting switches 42 and 43 which are provided for safety purposes, as both hands of the operator will be required to set the machine in operation and thereby avoid danger from either hand being between the dies when the machine starts to operate, these switches being for the purpose of starting operations of the machine. A fourth push button operates a reversing switch 44 and a fifth button actuates an inching switch 45 that may be employed for repeated momentary operations of the machine to cause the parts thereof to reach certain positions.

While the electric current for controlling operations of the motor, and hence of the machine, may be obtained from the main line in a manner that will be readily understood, yet, to simplify the illustration and description, such current is herein shown as supplied by a battery 46 and for convenience, and also to simplify the wiring diagram, the battery is shown as grounded at 47 that cooperates with grounds 48 and 49 for completing the electric circuit.

Now a reference to Fig. 5 will show a circuit comprising wires 50, 51, 52, 53, 54 and 55 connecting respectively the battery 46, supply switch 41, starting switches 42 and 43 and intermediate stopping switch 39, a normally closed main stopping switch 56 and a switch closing coil 57 which is grounded at 48 to complete the circuit. The switches 42 and 43 are normally open while the switch 39 is normally closed.

To start operation of the machine the switches 42 and 43 are closed by manual operation, this completing the circuit just described. The coil 57 being energized attracts its armature 58 which carries motor switches 59 and 60 and a maintenance switch 61, all of which switches being closed the motor is set in operation and the circuit is maintained through the switch 61 although the switches 42 and 43 promptly open upon manual pressure being removed therefrom. The circuit is continued by wire 62 from wire 51, and by wire 63, inching switch 45, wire 64, switch 61 and wire 65 to wire 53. The inching switch 45 is normally closed for this circuit.

The motor 26 is connected by wires 66 and 67 and switch 59 with line wire 68, and by wires 69 and 70 with line wire 71.

The motor being started operation of the machine takes place as hereinbefore described from the position of parts shown in Fig. 4 to the position shown in Fig. 1 wherein the switch 39 is about to be opened. Upon opening of this switch operation of the motor ceases and the spring 36 reversing movement of the lever 28, as hereinbefore described, causes the lever to operate to close the normally open switch 40. The circuit is now established from wire 62 by wire 72, switch 40 and wire 73 with the wire 65, the normally closed switch 39 having closed promptly upon being released by the lever 28 as it started its reverse movement.

This operation is repeated as many times as may be required until the toggle member 14 contacts with the main stopping switch 56 which, upon opening, stops the motor and completes the operation.

The reversing button is now operated to close the reversing switch 44, thereby starting the motor in the reverse operation, and the toggle levers are moved back to the starting positions, thereby operating a normally closed reversing stopping switch 74 to open the circuit and stop operation of the motor.

The reversing switch 44 is connected by wire 75 with the wire 62 and by wires 76 and 77 with a reversing maintenance switch 78 which is carried by the armature 79 of a reversing switch closing coil 80 which is grounded at 49, as hereinbefore explained. The armature 79 also carries reversing switches 81 and 82 connecting wires 83 and 84 from line wire 68 with one side of the motor, wires 85 and 86 connecting the opposite side of the motor with line wire 71. It is here remarked that both armatures 58 and 79 are spring retracted, as shown in Fig. 5 of the drawings.

When the reversing button is operated to close the switch 44 the circuit is completed by wire 75 from wire 62 and by wires 76, 87, switch 74 and wire 88 with the reversing switch closing coil 80 and ground 49. Energizing of the coil 80 closes the switches 78, 81 and 82, thereby starting the motor in reverse operation until the toggle member 15 contacts with the switch 74, opening said switch and stopping the reversing operation and setting the machine for a repetition of the work as hereinbefore explained.

The inching switch 45 is operated from its normal position shown in Fig. 5 to connect the wire 63 with an inching wire 89, the latter being connected with the wire 65. The circuit being open and the button to operate the inching switch being actuated, the machine may be intermittently started or "hitched" along until the parts are placed in a desired position.

In accordance with the provisions of the patent statutes we have described the principles of operation of our invention together with the device which we now consider to represent the best embodiment thereof; but we desire to have it understood that the device shown is only illustrative and that the invention may be carried out by other means and applied to uses other than those above set out.

We claim:

1. An actuating apparatus for pressure mechanism, said apparatus including an actuated member, movably mounted actuating means for moving said member in one direction, said actuating means including movably mounted interengaging threaded members one of which is operatively connected with the actuated member, means for operating the other of said threaded members, and means for yieldingly retaining said movably mounted means against movement to a limited degree.

2. An actuating apparatus for pressure mechanism, said apparatus including an actuated member, movably mounted actuating means for moving said member in one direction, said actuating means including a movably mounted threaded actuating rod connected with said actuated member, a sleeve internally threaded and engaged with the thread on said rod, means for rotating said sleeve, and means for yieldingly retaining said movably mounted means against movement to a limited degree.

3. An actuating apparatus for pressure mechanism, said apparatus including an actuated member, movably mounted actuating means for moving said member in one direction, said means including a housing with actuating mechanism therein operatively connected with said member, an extension from said housing, a lever pivotally connected to said extension, and a spring connected with said lever and operating therethrough to retain said movably mounted means against movement to a limited degree.

4. An actuating apparatus for pressure mechanism, said apparatus including an actuated member, movably mounted actuating means for moving said member in one direction, said means including a housing, an interiorly threaded sleeve rotatably mounted therein, means for rotating said sleeve, an actuating rod connected with said actuated member and threaded to engage said sleeve within said housing, a pivotally mounted lever connected with said housing, and a spring connected with said lever and operating therethrough to resist movement of said housing to a limited degree.

5. An actuating apparatus for pressure mechanism, said apparatus including an actuated member, movably mounted actuating means for moving said member in one direction, said mechanism including a mount comprising a motor and a housing, operating mechanism located within said housing and operatively connected with said actuated member, means for connecting said motor and mechanism within the housing, and a spring operatively connected with said mount to retain it against movement to a limited degree.

6. An actuating apparatus for pressure mechanism, said apparatus including an actuated member, movably mounted actuating means for moving said member in one direction, said actuating means including operating mechanism, means for yieldingly retaining said movably mounted means against movement to a limited degree, and means operated by said movably mounted means for stopping operation of said operating mechanism, and thereby cause operation of said yielding retaining means after a certain degree of movement has been attained.

7. An actuating apparatus for pressure mechanism, said apparatus including an actuated member, movably mounted actuating means for moving said member in one direction, said actuating means including operating mechanism, means for yieldingly retaining said movable means against movement to a limited degree, means operated by said movably mounted means for stopping operation of said operating mechanism and thereby cause operation of said yielding retaining means, after a certain degree of movement has been attained, to move said actuating means in an opposite direction, and means effected by said last mentioned movement for again starting operation of said operating mechanism.

8. An actuating apparatus for pressure me- mechanism, said apparatus including an actuated member, movably mounted actuating means for moving said member in one direction, said actuating means including operating mechanism, means for yieldingly retaining said movably mounted means against movement to a limited degree, means operated by said movably mounted means for stopping operation of said operating mechanism and thereby cause operation of said yielding retaining means after a certain degree of movement has been attained, and means operated by said actuated member for finally stopping operation of said operating mechanism.

9. An actuating apparatus for pressure mechanism, said apparatus including an actuated member, movably mounted actuating means for moving said member in one direction, said actuating means including electrically operated mechanism, means for yieldingly retaining said movable means against movement to a limited degree, two normally open starting switches for starting operation of said operating mechanism, a normally open maintenance switch, a motor actuating switch, and means actuated by the electric current on closing of said starting switches to close said maintenance and motor switches to effect operation of the motor.

10. An actuating apparatus for pressure mechanism, said apparatus including an actuated member, movably mounted actuating means for moving said member in one direction, said actuating means including electrically operated mechanism, a motor connected therewith, means for yieldingly retaining said movably mounted actuating means against movement to a limited degree, a normally open switch for starting operations of said operating mechanism, a motor actuating switch, means actuated by the electric current for closing said motor actuating switch, and a stopping switch located in the path of movement of said movably mounted actuating means for opening said circuit and stopping operation of the motor.

11. An actuating apparatus for pressure mechanism, said apparatus including an actuated member, movably mounted actuating means for moving said member in one direction, said actuating means including electrically operated mechanism, a motor connected therewith, means for yieldingly retaining said movably mounted actuating means against movement to a limited degree, a normally open switch for starting operations of said operating mechanism, a motor actuating switch, means actuated by the electric current for closing said motor actuating switch, a stopping switch located in the path of movement of said movably mounted actuating means for opening said circuit and stopping operation of the motor, and a starting switch located in the path of movement of said movably mounted actuating means for closing said circuit and starting operation of the motor.

12. An actuating apparatus for pressure mechanism, said apparatus including an actuated member, movably mounted means for moving said member in one direction, said movably mounted means including electrically operated mechanism, a motor connected therewith, means for starting operation of said motor, a motor actuating switch, means actuated by the electric current for closing said motor actuating switch, and a stopping switch located in the path of movement of said actuated member for opening the circuit and stopping the operation of the motor.

13. An actuating apparatus for pressure mechanism, said apparatus including an actuated member, movably mounted actuating means for moving said member in one direction, said actuating means including electrically operated mechanism, a normally open switch for starting operation of said operated mechanism, a normally open maintenance switch, a motor actuating switch, and means actuated by the electric current on closing of said starting switch to close said maintenance and motor switches to effect operation of the motor.

14. An actuating apparatus for pressure mechanism, said apparatus including an actuated member, movably mounted actuating means for moving said member in one direction, said actuating means including electrically operated mechanism, means for yieldingly retaining said movably mounted actuating means against movement to a limited degree, stopping and starting switches alternately operated by said movably mounted actuating means, a stopping switch to finally stop operations of said mechanism, a reversing mechanism including a reversing switch, a normally open maintenance switch, a motor actuating switch, and means actuated by the electric current on closing of said reversing switch to close said maintenance and motor switches to effect operation of the motor.

15. An actuating apparatus for pressure mechanism, said apparatus including an actuated member, movably mounted actuating means for moving said member in one direction, said actuating means including electrically operated mechanism, a normally closed inching switch constituting a part of the electrical circuit for operating said mechanism, and an inching electrical connection for said inching switch to close said circuit when the circuit of which said inching switch constitutes a part is open.

HARRY E. SLOAN.
GEORGE A. HIGHBERG.